United States Patent
Tsai et al.

(10) Patent No.: US 9,630,138 B2
(45) Date of Patent: *Apr. 25, 2017

(54) PRESSURE SWING ADSORPTION PROCESSES AND SYSTEMS FOR RECOVERY OF HYDROGEN AND $C_2+$ HYDROCARBONS

(71) Applicant: UOP LLC, Des Plaines, IL (US)

(72) Inventors: Robert E. Tsai, Arlington Heights, IL (US); Xin X. Zhu, Long Grove, IL (US); Joel J. Kaye, Long Grove, IL (US); Eleftherios Adamopoulos, Gurnee, IL (US)

(73) Assignee: UOP LLC, Des Plaines, IL (US)

( * ) Notice: Subject to any disclaimer, the term of this patent is extended or adjusted under 35 U.S.C. 154(b) by 9 days.

This patent is subject to a terminal disclaimer.

(21) Appl. No.: 14/739,315

(22) Filed: Jun. 15, 2015

(65) Prior Publication Data

US 2015/0375159 A1 Dec. 31, 2015

Related U.S. Application Data

(60) Provisional application No. 62/017,820, filed on Jun. 26, 2014.

(51) Int. Cl.
*C01B 3/02* (2006.01)
*B01D 53/047* (2006.01)
*C01B 3/56* (2006.01)

(52) U.S. Cl.
CPC .............. *B01D 53/047* (2013.01); *C01B 3/56* (2013.01); *B01D 2256/16* (2013.01);
(Continued)

(58) Field of Classification Search
CPC .............. B01D 53/047; B01D 2256/16; B01D 2257/7022; B01D 2257/7025; C01B 3/02; C01B 3/56
(Continued)

(56) References Cited

U.S. PATENT DOCUMENTS 4,171,206 A * 10/1979 Sircar ................ B01D 53/0476
95/101
4,171,207 A 10/1979 Sircar
(Continued)

FOREIGN PATENT DOCUMENTS

CN 101503335 A 8/2009
JP 2010209036 A 9/2010

OTHER PUBLICATIONS

PCT International Search Report and Written Opinion dated Aug. 27, 2015 for PCT/US2015/036317, Applicant's file reference.
(Continued)

*Primary Examiner* — Frank Lawrence

(57) ABSTRACT

The invention involves a process for treating a gas stream from a hydroprocessor that contains hydrogen, methane and $C_2+$ hydrocarbons. In embodiments of the invention, the gas stream is sent through at least two pressure swing adsorption units to produce a high quality hydrogen stream, a fuel gas stream containing most of the methane and a tail gas stream that is sent to a steam cracker. Lean gas from a gas plant and other refinery off gases may also be processed together with the gas stream from the hydroprocessor.

4 Claims, 3 Drawing Sheets

(52) U.S. Cl.
CPC ............... *B01D 2257/7022* (2013.01); *B01D 2257/7025* (2013.01); *Y02C 20/20* (2013.01)

(58) Field of Classification Search
USPC ............. 95/96, 143; 585/800, 820, 822, 826
See application file for complete search history.

(56) References Cited

U.S. PATENT DOCUMENTS

| | | |
|---|---|---|
| 5,174,796 A | 12/1992 | Davis et al. |
| 5,365,011 A * | 11/1994 | Ramachandran ......... C07C 7/13 585/654 |
| 5,672,197 A | 9/1997 | Rothchild |
| 5,856,607 A | 1/1999 | Kim |
| 6,011,192 A | 1/2000 | Baker et al. |
| 6,159,272 A | 12/2000 | Baker et al. |
| 6,444,012 B1 | 9/2002 | Dolan et al. |
| 6,444,869 B2 | 9/2002 | Senetar et al. |
| 6,592,749 B1 | 7/2003 | Lokhandwala et al. |
| 6,610,124 B1 | 8/2003 | Dolan et al. |
| 2009/0211442 A1 * | 8/2009 | Allam ....................... C01B 3/36 95/96 |
| 2012/0222552 A1 | 9/2012 | Ravikovitch et al. |
| 2014/0018589 A1 | 1/2014 | Iyer et al. |
| 2015/0375160 A1 * | 12/2015 | Tsai ..................... B01D 53/047 95/96 |

OTHER PUBLICATIONS

Cavenati, "Separation of CH4/CO2/N2 mixtures by layered pressure swing adsorption for upgrade of natural gas", Chemical Engineering Science 61 (2006) 3893-3906.

Jain, "Hydrogen recovery from refinery offgases", Petroleum Technology Quarterly, v 12, n 3, p. 41-43, 2007; ISSN: 1362363X; Publisher: Crambeth Allen Publishing.

Kapoor, "Kinetic separation of carbon dioxide from hydrocarbons using carbon molecular sieve", Gas Separation & Purification vol. 7, Issue 4, 1993, pp. 259-263.

Mutasim, "Pressure swing adsorption in non-isothermal, non-equilibrium conditions . . . single adsorbate", Chemical Engineering Research & Design (ISSN 0263-8762) V69 N.A2 108-18 (Mar. 1991), v 69, n A2, p. 108-118, Mar. 1991.

Pacalowska, "Improve hydrogen recovery from refinery offgases", Hydrocarbon Processing (ISSN 0018-8190) V75 N.11 55-59 (Nov. 1996), v 75, n 11, p. 55-59, Nov. 1996; ISSN: 00188190; Publisher: Gulf Publishing Co.

* cited by examiner

PRESSURE SWING ADSORPTION PROCESSES AND SYSTEMS FOR RECOVERY OF HYDROGEN AND $C_2+$ HYDROCARBONS

CROSS-REFERENCE TO RELATED APPLICATION

This application claims priority from Provisional Application No. 62/017,820 filed Jun. 26, 2014, the contents of which are hereby incorporated by reference.

BACKGROUND OF THE INVENTION

This invention relates to improvements in feedstock to steam cracker units and other improvements that significantly improve the profitability of a gas processing unit within an integrated refinery and steam cracker complex including recovering $C_2+$ hydrocarbons that previously would have been burned in fuel gas.

Steam crackers convert hydrocarbon feedstock to streams rich in light alkenes like ethylene and propylene and are used as a principal industrial means to generate these valuable petrochemical products. However, the presence of hydrogen and methane in the feed to a steam cracker is detrimental, as they are not involved in the conversion of hydrocarbons and thus wastefully consume capacity and energy. Minimization of the volume of hydrogen and methane can therefore yield considerable capital and operating expense savings—not only for the steam cracker but also downstream low-temperature separation equipment such as the cold box, which can subsequently be operated at a higher temperature.

DETAILED DESCRIPTION OF THE INVENTION

Figure 1:
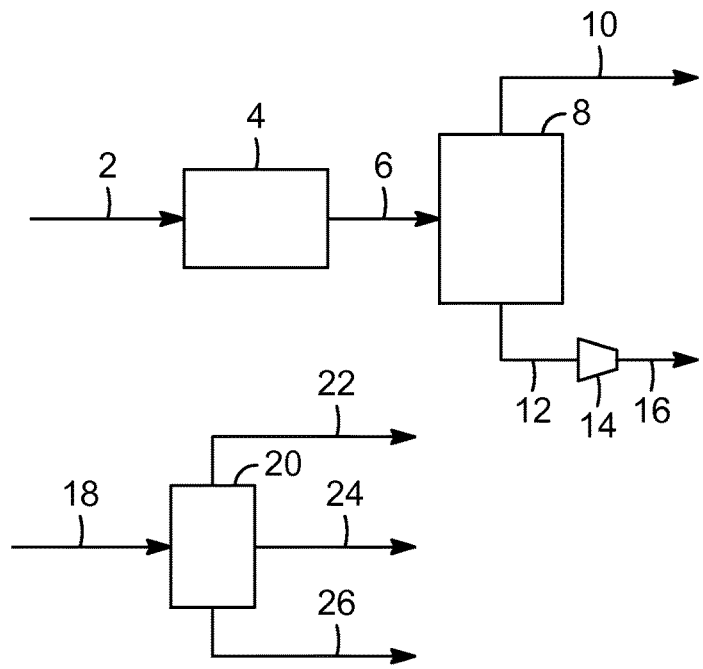
FIG. 1 shows a base gas processing scheme that is typical of prior art designs.

An example base scheme for a gas processing section within an integrated refinery and steam cracker complex is shown in FIG. 1. This section generates some high-purity hydrogen and fuel gas, but its main value is in the preparation of feed to the steam cracker. The feed gas is composed of separator off gases from various hydroprocessing units within the refinery complex ("flash drum gases"), as well as off gases from the crude unit and stripper column off gases from the hydroprocessing units ("stripper gases"), and it consists of a mix of hydrogen and hydrocarbons (primarily saturated $C_1$-$C_4$). The flash drum gases are at fairly high pressure (791 to 3204 kPa, 100 to 450 psig) and are relatively concentrated in hydrogen (30 to 95 mol %). These are blended and sent to a pressure-swing adsorption (PSA) unit to produce high-purity (99.9 mol %) hydrogen and a tail gas stream that is used for fuel gas. At the same time, the stripper gases are processed in a gas recovery unit ("gas plant"), which for typical configurations is an assembly of absorbers and fractionators that produces a light gas stream that comprises primarily hydrogen and $C_2-$ hydrocarbons ("lean gas"), an LPG ($C_3/C_4$ hydrocarbons) stream, and a naphtha stream that comprises primarily heavier hydrocarbons. The lean gas from the gas plant is afterward sent to the steam cracker. The LPG and naphtha may also be eventually fed to the steam cracker as well.

The present invention involves a two-stage PSA separation scheme (FIG. 2) to establish a more favorable feed for the steam cracker and downstream equipment. As much as all of the $C_2+$ that in prior art systems went to fuel gas is instead shifted to the steam cracker, thereby greatly enhancing product value. This is accomplished while limiting or possibly even reducing the hydrogen/methane content that concurrently enters the steam cracker, which is preferable in the context of capital and operating expenses. In the new flow scheme, the combined flash drum gases are sent to a first PSA unit, PSA 1. This PSA unit operates to separate out both hydrogen and methane while maximizing the rejection of $C_2+$ to the tail gas. This gas, which is depleted in hydrogen and methane, is then fed to the steam cracker. The high-pressure PSA product stream goes to a second PSA unit, PSA 2, where it is separated into 99.9 mol % hydrogen and tail gas that can be compressed and used for fuel gas. The gas plant operates the same as in the prior art (FIG. 1). A significant net product value gain can be achieved with the new case (FIG. 2) versus the base scheme (FIG. 1), at the minimal expense of adding a second PSA unit. For a basis of 139 MT/day combined flash drum gas feed to the gas processing section, around 71 MT/day of additional $C_2+$ hydrocarbons feed may be sent to the steam cracker while likewise only sending 7 MT/day of additional hydrogen and methane.

The invention involves the use of PSA systems. PSA provides an efficient and economical means for separating a multi-component gas stream containing at least two gases having different adsorption characteristics. The more strongly adsorbable gas can be an impurity which is removed from the less strongly adsorbable gas which is taken off as product; or, the more strongly adsorbable gas can be the desired product, which is separated from the less strongly adsorbable gas. In PSA, a multi-component gas is typically fed to at least one of a plurality of adsorption zones at an elevated pressure effective to adsorb at least one component, while at least one other component passes through. At a defined time, the feedstream to the adsorber is terminated and the adsorption zone is depressurized by one or more co-current depressurization steps wherein pressure is reduced to a defined level which permits the separated, less strongly adsorbed component or components remaining in the adsorption zone to be drawn off without significant concentration of the more strongly adsorbed components. Then, the adsorption zone is depressurized by a counter-current depressurization step wherein the pressure on the adsorption zone is further reduced by withdrawing desorbed gas counter-currently to the direction of the feedstream. Finally, the adsorption zone is purged and repressurized. The combined gas stream produced during the counter-current depressurization step and the purge step is typically referred to as the tail gas stream. The final stage of repressurization is typically performed by introducing a slipstream of product gas comprising the lightest gas component produced during the adsorption step. This final stage of repressurization is often referred to as product repressurization. In multi-zone systems, there are typically additional steps, and those noted above may be done in stages.

U.S. Pat. No. 5,672,197, hereby incorporated by reference, discloses a process for the separation of a mixture of gases wherein an internal gas flow is pumped through a plurality of beds containing a pressure dependent adsorbent. The beds are connected in series. Gas is pumped from the most upstream of the beds to generate the internal gas flow, displacing gas through the series in the downstream direction. A first inlet flow is withdrawn from the most upstream bed. The first outlet flow consists primarily of the most highly adsorbed component. Feedstock is added downstream of the first outlet, separated by at least one bed and a second outlet flow is withdrawn from a second outlet in fluid communication with the most downstream bed in series. At the end of the cycle, gas pressure in the most downstream bed is increased to operating pressure, while pressure in the most upstream bed is reduced to the lower pressure. At the end of the cycle, valves are used to switch positions of the inlet and outlet ports and bed connections so that each bed effectively advances upstream with respect to the internal gas flow by one position, except for the most upstream bed which is effectively moved to the most downstream position.

Various classes of adsorbents are known to be suitable for use in PSA systems, the selection of which is dependent upon the feedstream components and other factors. Molecular sieves such as the microporous crystalline zeolite and non-zeolitic catalysts, particularly aluminophosphates (AlPO) and silicoaluminophosphates (SAPO), are known to promote reactions such as the conversion of oxygenates to hydrocarbon mixtures.

The net effect of the flow scheme is that almost all of the $C_2+$ can be sent to the steam cracker (instead of fuel gas) without consequently overloading the unit with hydrogen and methane. The following assessment is based on the diagram in FIG. 2, but other conditions and configurations are possible. For instance, the lean gas from the gas plant could be compressed and combined with the flash gases upstream of the PSA train (FIG. 3), or the stripper gases, that include stripper gases and other refinery off gases, could be compressed and mixed directly with the flash gases (FIG. 4). Either option (FIG. 3 or 4) could increase overall hydrogen recovery and further unload hydrogen/methane from the steam cracker, potentially reducing hydrogen/methane to even lower levels than in the prior art (FIG. 1) and would be logical for scenarios where these benefits outweigh the extra required compression costs. As another idea, the PSA 2 tail gas could alternatively be compressed and used as steam reformer feedstock, as it is comprised of hydrogen and methane along with possibly a small quantity of $C_2+$ hydrocarbons. The initial flash gas feeds contain sulfur and are assumed to be treated prior to the PSA section in this application, but there are various options for location of this sulfur-removal process within (or even outside of) the flow scheme. Finally, a two-stage PSA process is described, but more stages could be included to extend the concept and further strip methane.

FIG. 1 shows a base gas processing scheme in which a gas stream 2 from a hydroprocessing unit that is a flash drum gas blend is sent to a scrubber and knockout drum unit 4 for sulfur removal. In a simulation, the gas stream will be a 139 MT/day stream and 18.2 MT-mole/day. In this example, the gas stream comprises 81 mol % hydrogen, 2 mol % hydrogen sulfide, less than 1 mol % water, 8 mol % methane and 9 mol % $C_2+$. The stream is at 52° C. (125° F.) and 3018 kPa (423 psig). Then a 16,750.05 nm$^3$/hour (15 MMSCFD) gas stream 6 is sent to a PSA unit 8. A hydrogen product stream 10 is produced that is 99.9 mol % hydrogen that in this example is produced at a rate of 27 MT/day, 13.2 MT-mole/day. Also produced is a fuel gas stream 12 at 136 kPa (5 psig) that passes through compressor 14 to pressurized fuel gas 16, that is at 618 kPa (75 psig). The fuel gas in this example comprises 33 mol % hydrogen, 2 mol % water, 31 mol % methane and 35 mol % $C_2+$. The fuel gas is produced at a rate of 99 MT/day, 4.5 MT-mole/day and 4,243.35 nm$^3$/hour (3.8 MMSCFD). Also, shown in FIG. 1 is a stripper gas blend 18 that is shown going to gas plant 20 that produces a lean gas stream 22, LPG stream 24 and naphtha stream 26, all of which may be sent to a steam cracker.

Figure 2:
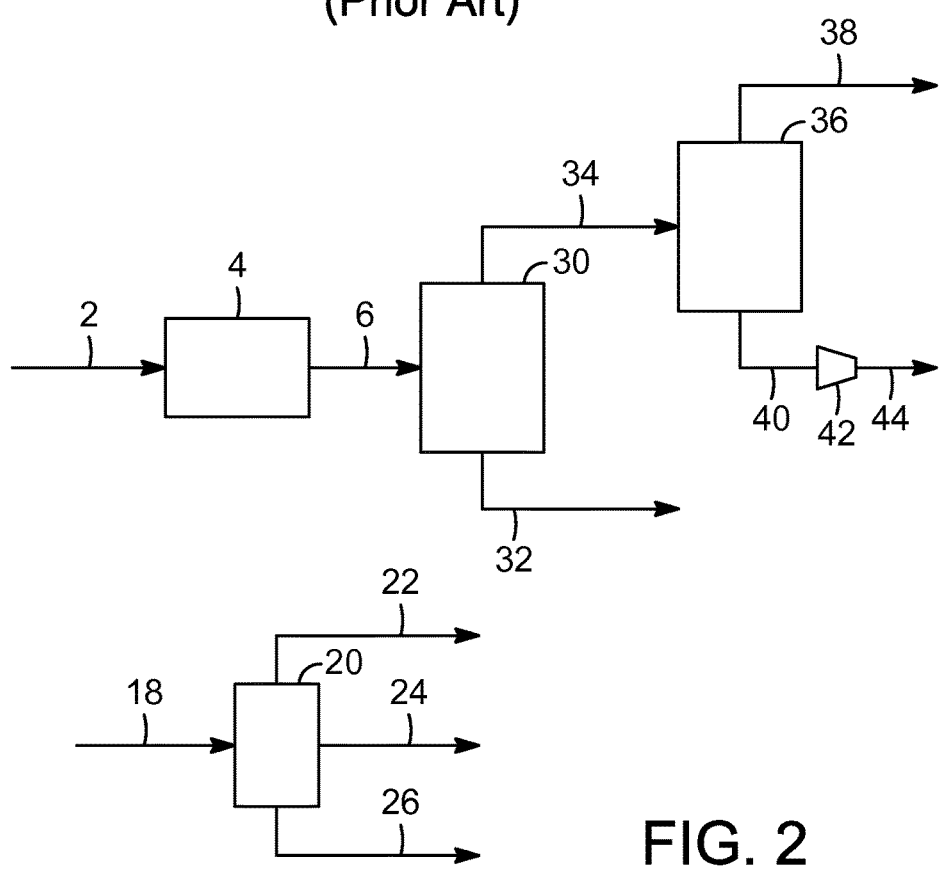
FIG. 2 shows a flow scheme of the present invention with a two stage pressure swing adsorption train.

In FIG. 2, is shown a flow scheme that results in the vast majority of the $C_2+$ hydrocarbons being sent to a steam cracker and a significant majority of the methane sent to fuel gas instead of the steam cracker. A gas stream 2 from a hydroprocessing unit that is a flash drum gas blend is sent to a scrubber and knockout drum unit 4 for sulfur removal. As noted above, in a simulation, the gas stream will be a 139 MT/day stream and 18.2 MT-mole/day. In this example, the gas stream comprises 81 mol % hydrogen, 2 mol % hydrogen sulfide, less than 1 mol % water, 8 mol % methane and 9 mol % $C_2+$. The stream is at 52° C. (125° F.) and 3018 kPa (423 psig). Then a 16,750.05 nm$^3$/hour (15 MMSCFD) gas stream 6 is sent to a first PSA unit 30. A tail gas 32 is at 136 kPa (5 psig) and is sent to a steam cracker. This tail gas comprises 38 mol % hydrogen, 3 mol % water, 9 mol % methane and 51 mol % $C_2+$ hydrocarbons. A stream 34 that comprises 92 mol % hydrogen, 8 mol % methane and less than 0.1 mol % $C_2+$ hydrocarbons is sent to a second PSA unit 36 that produces a 99.9 mol % hydrogen product stream 38 that in this example is produced at a rate of 25 MT/day, 12.2 MT-mole/day. Also produced from the second PSA unit 36 is a is a fuel gas stream 40 at 136 kPa (5 psig) that passes through compressor 42 to pressurized fuel gas 44, that is at 618 kPa (75 psig). The fuel gas in this example comprises 55 mol % hydrogen, 45 mol % methane and 0.3 mol % $C_2+$. The fuel gas is produced at a rate of 21 MT/day, 2.5 MT-mole/day and 2,345.01 nm$^3$/hour (2.1 MMSCFD). Also, shown in FIG. 2 is a stripper gas blend 18 that is shown going to gas plant 20 that produces a lean gas stream 22, LPG stream 24 and naphtha stream 26, all of which may be sent to a steam cracker.

The low-pressure tail gas from the first PSA unit may be sent to the suction of a cracked gas compressor which compresses the gases from the steam cracker furnaces prior to being sent to the product recovery section (pre-treating, cold box and fractionation). The product recovery section will recover the $C_2+$ paraffin material that is recycled to the steam cracker furnaces. The methane and hydrogen will be separated out by the cold box in the product recovery section. An alternative arrangement is to feed the tail gas product directly to the steam cracker furnaces. This could be done by compressing the tail gas to the pressure required to get it into the furnaces or by designing the PSA tail gas with a pressure sufficient to get it into the steam cracker furnaces. The steam cracker furnace products will then go to the cracked gas compressor and be processed as discussed above.

Figure 3:
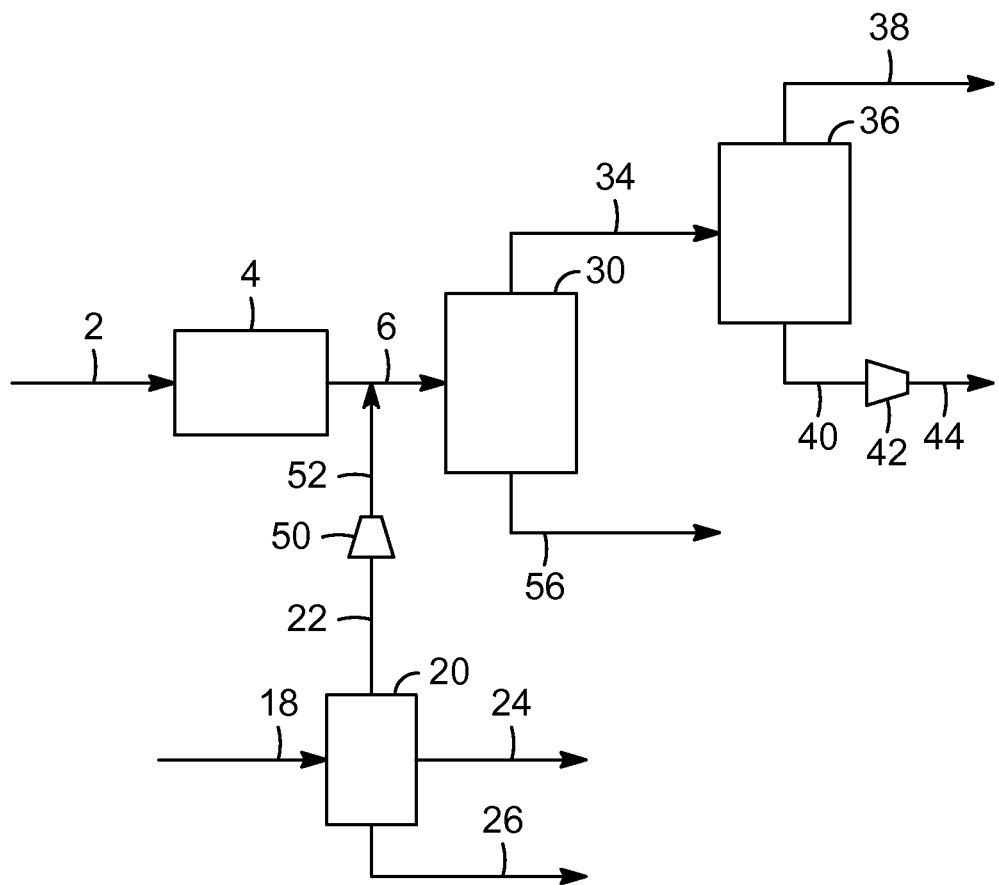
FIG. 3 shows an alternative scheme with additional lean gas from a gas plant sent to the two-stage pressure swing adsorption train.
Figure 4:
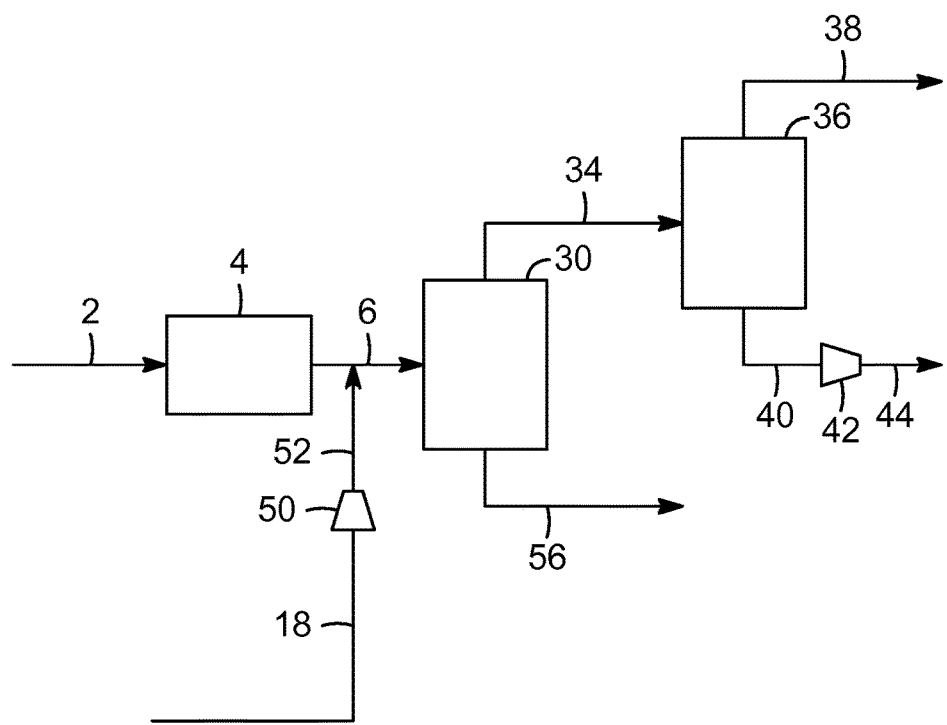
FIG. 4 shows an alternative scheme with stripper gas also sent to the two-stage pressure swing adsorption train.

FIG. 3 provides an alternative flow scheme in which additional lean gas from a gas plant is sent to the two-stage PSA system. In this flow scheme the vast majority of the $C_2+$ hydrocarbons are sent to a steam cracker and a significant majority of the methane is sent to fuel gas instead of the steam cracker. A gas stream 2 from a hydroprocessing unit that is a flash drum gas blend is sent to a scrubber and knockout drum unit 4 for sulfur removal. Then a gas stream 6 is sent to a first PSA unit 30. A tail gas 56 is at 136 kPa (5 psig) and is sent to a steam cracker. A stream 34 is sent to a second PSA unit 36 that produces a 99.9 mol % hydrogen product stream 38. Also produced from the second PSA unit 36 is a fuel gas stream 40 at 136 kPa (5 psig) that passes through compressor 42 to pressurized fuel gas 44, that is at 618 kPa (75 psig). Also, shown in FIG. 3 is a stripper gas blend 18 that is shown going to gas plant 20 that produces lean gas stream 22, LPG stream 24 and naphtha stream 26. The lean gas stream 22 is sent to a compressor 50 to pressurized lean gas stream 52 that is combined with gas stream 6 to be sent through the PSA system. The LPG stream 24 and naphtha stream 26 are both sent for further processing, such as in a steam cracker.

FIG. 4 provides an alternative flow scheme in which additional gas from within the refinery complex is sent to the two-stage PSA system. In this flow scheme the vast majority of the $C_2+$ hydrocarbons are sent to a steam cracker and a significant majority of the methane is sent to fuel gas instead of the steam cracker. A gas stream 2 from a hydroprocessing unit that is a flash drum gas blend is sent to a scrubber and knockout drum unit 4 for sulfur removal. Then a gas stream 6 is sent to a first PSA unit 30. A tail gas 56 is at 136 kPa (5 psig). A stream 34 is sent to a second PSA unit 36 that produces a 99.9 mol % hydrogen product stream 38. Also produced from the second PSA unit 36 is a fuel gas stream 40 at 136 kPa (5 psig) that passes through compressor 42 to pressurized fuel gas 44, that is at 618 kPa (75 psig). A refinery gas stream 18 is sent to a compressor 50 to pressurized gas stream 52 that is combined with gas stream 6 to be sent through the PSA system.

The described features, structures, or characteristics of the invention may be combined in any suitable manner in one or more embodiments. In the above description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention. In other words, the present invention may be embodied in other specific forms without departing from its spirit or essential characteristics. The described implementations are to be considered in all respects only as illustrative and not restrictive. The scope of the invention should, therefore, be determined not with reference to the above description, but instead should be determined with reference to the pending claims along with their full scope or equivalents, and all changes which come within the meaning and range of equivalency of the claims are to be embraced within their full scope.

SPECIFIC EMBODIMENTS

While the following is described in conjunction with specific embodiments, it will be understood that this description is intended to illustrate and not limit the scope of the preceding description and the appended claims.

A first embodiment of the invention is a process for treating at least one gas stream comprising hydrogen, methane and $C_2+$ hydrocarbons, the process comprising (a) sending the gas stream through a pressure swing adsorption unit to produce a first purified stream and a second purified stream, wherein the first purified gas stream comprises more than 80% of the hydrogen from the gas stream and at least 60% of the methane from the at least one gas stream and wherein the second purified gas stream comprises at least 90% of the $C_2+$ hydrocarbons from the gas stream; and (b) sending the first purified gas stream to a second pressure swing adsorption unit to produce a hydrogen product stream comprising at least 80% hydrogen and a fuel gas stream comprising at least 90% of the methane from the gas stream. An embodiment of the invention is one, any or all of prior embodiments in this paragraph up through the first embodiment in this paragraph wherein the at least one gas stream is from a hydroprocessing unit. An embodiment of the invention is one, any or all of prior embodiments in this paragraph up through the first embodiment in this paragraph wherein the hydrogen product stream comprises more than 99 mol % hydrogen. An embodiment of the invention is one, any or all of prior embodiments in this paragraph up through the first embodiment in this paragraph wherein the first purified gas stream comprises more than 80 mol % of the methane from the at least one gas stream. An embodiment of the invention is one, any or all of prior embodiments in this paragraph up through the first embodiment in this paragraph wherein the fuel gas comprises less than 1 mol % $C_2+$ hydrocarbon. An embodiment of the invention is one, any or all of prior embodiments in this paragraph up through the first embodiment in this paragraph further comprising sending a stripper gas to a gas plant that produces a plurality of streams including a lean gas stream and combining the lean gas stream with the at least one gas stream.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for treating at least one gas stream comprising hydrogen, methane and $C_2+$ hydrocarbons, said process comprising:
    (a) sending said gas stream through a first pressure swing adsorption unit to produce a first purified stream and a second purified stream, wherein said first purified gas stream comprises more than 80% of the hydrogen from said gas stream and at least 60% of said methane from said at least one gas stream and wherein said second purified gas stream comprises at least 90% of said $C_2+$ hydrocarbons from said gas stream;
    (b) sending said first purified gas stream to a second pressure swing adsorption unit, wherein the second pressure swing adsorption unit is in series with the first pressure swing adsorption unit to produce a hydrogen product stream comprising at least 80% hydrogen and a fuel gas stream comprising at least 90% of said methane from said gas stream;
    c) sending a stripper gas to a gas plant that produces a plurality of streams including a lean gas stream and combining said lean gas stream with said at least one gas stream; and
    d) sending $C_2+$ hydrocarbons to a steam cracker.

2. The process of claim 1 wherein said at least one gas stream is from a hydroprocessing unit.

3. The process of claim 1 wherein said hydrogen product stream comprises more than 99 mol % hydrogen.

4. The process of claim 1 wherein said fuel gas comprises less than 1 mol % $C_2+$ hydrocarbon.

* * * * *